(12) United States Patent
Dalke (10) Patent No.: US 7,656,552 B1
(45) Date of Patent: Feb. 2, 2010

(54) UNIFIED IMAGE PROCESSING SYSTEM

(76) Inventor: George W. Dalke, 1247 Pitman Ave., Palo Alto, CA (US) 94301

( * ) Notice: Subject to any disclaimer, the term of this patent is extended or adjusted under 35 U.S.C. 154(b) by 1166 days.

(21) Appl. No.: 10/782,491

(22) Filed: Feb. 18, 2004

Related U.S. Application Data (60) Provisional application No. 60/448,080, filed on Feb. 20, 2003.

(51) Int. Cl.
*G06F 15/00* (2006.01)
*G06K 15/00* (2006.01)

(52) U.S. Cl. .................................. 358/1.18; 358/452

(58) Field of Classification Search ............... 358/1.1, 358/1.8, 1.9, 3.26, 3.27, 447, 448, 540, 532, 358/1.18, 452; 382/254, 276, 278, 302, 169; 704/203, 229; 708/5; 715/236, 249

See application file for complete search history.

(56) References Cited

U.S. PATENT DOCUMENTS

| | | | |
|---|---|---|---|
| 4,183,046 A | 1/1980 | Dalke et al. | |
| 4,429,998 A | 2/1984 | Carson et al. | |
| 4,488,245 A | 12/1984 | Dalke et al. | |
| 4,621,337 A * | 11/1986 | Cates et al. | 708/410 |
| 5,650,942 A | 7/1997 | Granger | |
| 5,790,705 A | 8/1998 | Anderson et al. | |
| 5,809,178 A | 9/1998 | Anderson et al. | |
| 6,028,611 A | 2/2000 | Anderson et al. | |
| 6,262,769 B1 | 7/2001 | Anderson et al. | |
| 6,839,471 B1 * | 1/2005 | Vogt, IV | 382/280 |
| 7,324,036 B2 * | 1/2008 | Petre et al. | 341/155 |
| 7,342,684 B2 * | 3/2008 | Imafuku et al. | 358/1.9 |
| 2004/0008904 A1 * | 1/2004 | Lin et al. | 382/275 |

OTHER PUBLICATIONS

Dalke, Dr. G., "Image Optimization for a Digital/Wireless World, 4G Universal Image Transform™ Architecture", posted on Jul. 21, 2002, 2 pages.
Graphic Arts Technical Foundation (GATF), "Using ColorSync® in Illustration Software", Nov. 10, 1999, v. 1.10, 5 pages.
International Display Technology, "Introduction to Color Management Functions", Rev. 1.10, Dec. 3, 2002,9 pages.
Lundmark, Hans, "Visualizing complex analytic functions using domain coloring", 2002, Dept of Mathematics, Linköping University, Sweden, Downloaded from http://www.mai.lie.se/~halun/complex.html, 24 pages.
Poynton, Charles, "Frequently Asked Questions about Color", Mar. 2, 1997, from www.poynton.com, 24 pages.
Poynton, Charles, "Frequently Asked Questions about Gamma", Jan. 4, 1998, from www.poynton.com, 12 pages.

(Continued)

*Primary Examiner*—Gabriel I Garcia
(74) *Attorney, Agent, or Firm*—Townsend and Townsend and Crew LLP

(57) ABSTRACT

An image processing method includes generating a synthesized image transform from a set of synthesizing parameters, and subjecting the input image to the synthesized image transform to form an output image. The synthesized image transform is generated from a set of synthesizing parameters, which have a defined domain of allowed values. The complete set of synthesized transforms is obtained by varying the synthesizing parameters over all values within the domain. The visual effect of each synthesized transform is characterized by a set of visual effect parameters. The visual effect parameters and the synthesizing parameters are related in that the visual effect parameters are generated from the synthesizing parameters for the complete set of transforms, and/or the synthesizing parameters are generated from the visual effect parameters for the complete set of transforms.

37 Claims, 11 Drawing Sheets

Composing a sequence of parameteric transforms into a single transform

Figure 1 (Prior Art), Image Transform

Figure 2, Parametric Image Transform

Figure 3, Image Visual Effect Functions and Parameters

Figure 4, Transform Visual Effect Parameters

Figure 5, Transform Parameter Set and Visual Effect Parameter Set Conversion

Figure 6 Composing a sequence of parameteric transforms into a single transform

Figure 7, Scalar Composition

Figure 8, Simulation of a sequence of arbitrary transforms

Figure 9, Simulation of a sequence of arbitrary transforms

Figure 10, Synthesis based on a sequence of visual intents

Figure 11, Execution of a selective image transform

Figure 12, Derivation of a v-array

Figure 13, Program/file overview

UNIFIED IMAGE PROCESSING SYSTEM

CROSS REFERENCE TO RELATED APPLICATIONS

This application claims priority to U.S. Provisional Patent Application No. 60/448,080, filed Feb. 20, 2003 for Unified Image Processing System, the entire disclosure of which is incorporated by reference for all purposes.

ATTACHED DOCUMENTS PART OF THIS APPLICATION

The following documents are attached to this application and are considered part of this application:
1. Copy of U.S. Provisional Patent Application No. 60/448, 080, filed Feb. 20, 2003 for Unified Image Processing System. 16 pages.
2. HTML user interface example. 1 page.
3. HTML user interface example source code. 10 pages.
4. Text Form user interface example. 1 page.
5. Parameter Array File Diagnostic Form. 1 page.
6. Text Form user interface to Parameter Array File source code. 10 pages.
7. Parameter Array composition source code. 7 pages.
8. Parameter Array to Diagnostic Form source code. 9 pages.
9. Parametric Image Transform Execution source code. 17 pages.
10. "Parametric Transforms." 4 pages.

BACKGROUND OF THE INVENTION

During image processing and manipulations, problems with processed images, which are referred to as pathologies, arise. In most cases, it is up to the user to avoid pathologies by visual feedback and interactively moving a control to adjust the amount of processing tolerated by a particular image. The control settings are generally a compromise between increasing the desirable results and keeping the pathologies acceptably low.

Some examples of image pathologies are as follows. A typical "sharpen" filter causes halo and outlining effect, and may further enhance jpeg artifacts, particularly in relatively uniform areas such as sky. Further, burn out and color shift are often caused by brightness adjustment. Posterization and localized color shifts are caused by excessive processing. Textured objects are "flattened" by low local contrast in part of the transform.

SUMMARY OF THE INVENTION

According to one aspect, the invention provides an image processing method that comprises generating a synthesized image transform from a set of synthesizing parameters; and subjecting the input image to the synthesized image transform to form an output image wherein: the synthesized image transform is generated from a set of synthesizing parameters; the synthesizing parameters have a defined domain of allowed values; the complete set of synthesized transforms is obtained by varying the synthesizing parameters over all values within the domain; the visual effect of each synthesized transform is characterized by a set of visual effect parameters; and the visual effect parameters and the synthesizing parameters are related in that the visual effect parameters are generated from the synthesizing parameters for the complete set of transforms, and/or the synthesizing parameters are generated from the visual effect parameters for the complete set of transforms.

In some embodiments, the synthesizing parameter sets are composable (that is, a function or algorithm combines two or more sets of synthesizing parameters into a single set of synthesizing parameters); and the composed synthesizing parameters are sequentially equivalent (that is, an image processed sequentially by two or more synthetic transforms will be equivalent to an image processed through a single transform which has been synthesized from the synthesizing parameter set composed from the synthesizing parameter sets of the sequential transforms).

Embodiments of the invention are capable of eliminating or significantly reducing pathologies, while simplifying the optimization of images, thereby removing the need for experienced operators and interactive controls. The transforms also produce superior images without degrading the data from the original image. This feature allows an image to undergo further processing, while eliminating the occurrence of further pathologies.

A further understanding of the nature and advantages of the present invention may be realized by reference to the remaining portions of the specification and the drawings.

DESCRIPTION OF SPECIFIC EMBODIMENTS

Figure 1:
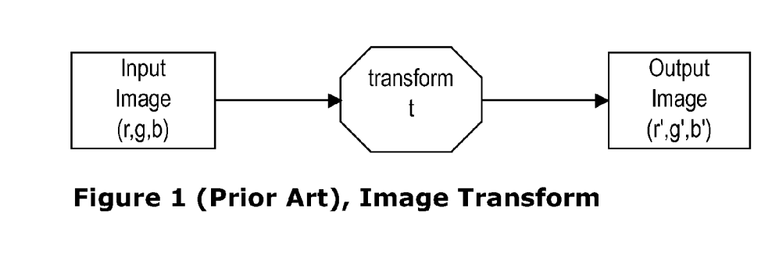
FIG. 1 shows an image transform.

FIG. 1 shows an image transform. Page 5 of the Provisional Application, section "Fundamental Definition and Algorithms," subsection "Image transform" presents a notation for an arbitrary image transform. Note that the notation x'=t(x) is equivalent to:

$r'=t_r(r,g,b)$ $g'=t_g(r,g,b)$ $b'=t_b(r,g,b)$

Figure 2:
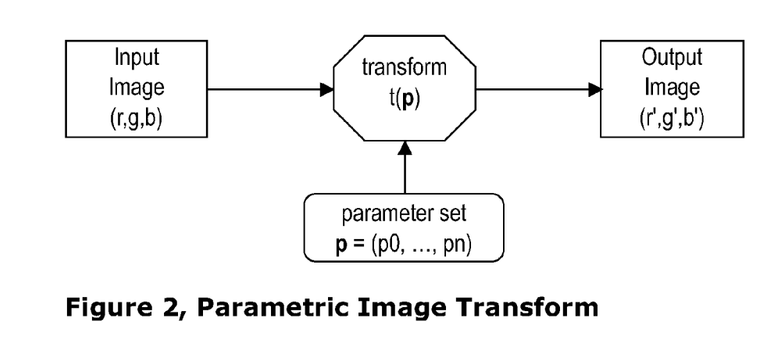
FIG. 2 shows a parametric image transform.

FIG. 2 shows a parametric image transform. Page 8 of the Provisional Application, section "Fundamental Definition and Algorithms," subsection "Parametric transforms" presents the notation and definition for a parametric transform. We also refer to a parametric transform as a "synthesized" transform.

Figure 3:
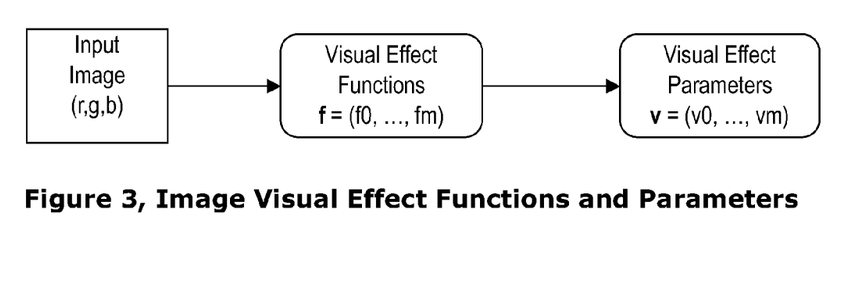
FIG. 3 shows image visual effect functions and parameters.

FIG. 3 shows image visual effect functions and parameters. Page 7 of the Provisional Application, section "Fundamental Definition and Algorithms," subsection "Analytic selective transforms" presents the notation and definition for a set of analytic selective functions. The selective functions are also referred to as visual effect functions.

Associated with each selection function is a "visual effect" given by a set of visual effect parameters. Each visual effect parameter is the statistical expected value of the visual effect functions, given by the equation $$V=<f>=\iiint f(r,g,b)p(r,g,b)dr\, dg\, db$$

where p(r,g,b) is the joint probability distribution of the input image.

Figure 4:
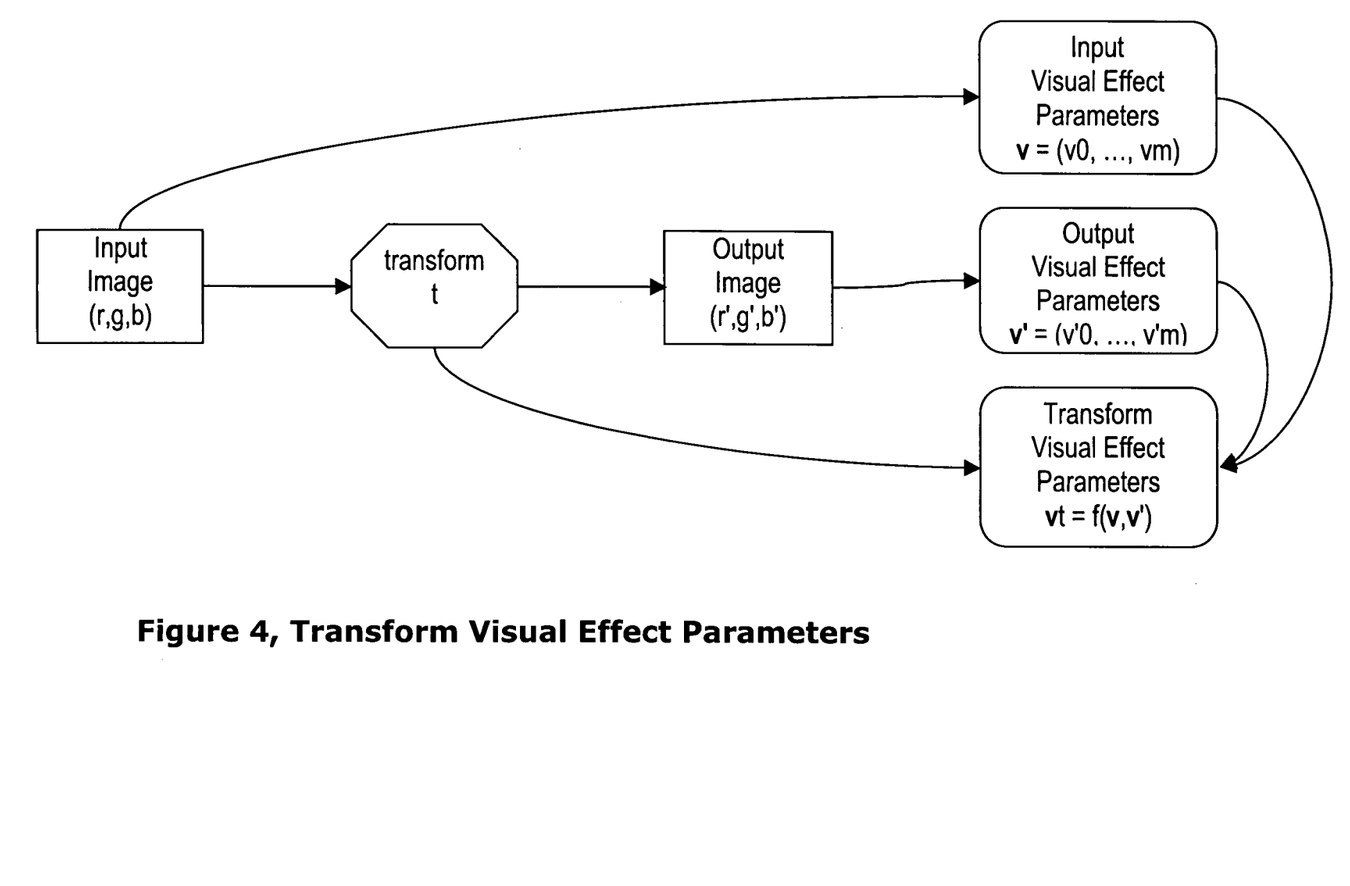
FIG. 4 shows transform visual effect parameters.

FIG. 4 shows transform visual effect parameters. The definition of the visual effect parameters is given by an image probability distribution. Since the probability distribution of the output image can be calculated directly from the transform, we can associate the visual effect parameter with the transform for a given input. By definition, the output visual response parameter is $$V'=\iiint f(r',g',b')p'(r',g',b')dr'\, dg'\, db'$$

We can calculate the output probability distribution from the transform and the input probability distribution as $$p'(r',g',b')=p(t_{inv}(r',g',b'))$$

Introducing a change of variables, we get $$V'=\iiint f(t(r,g,b))p(r,g,b)dr\, dg\, db$$

This remarkable results allows us to associate the visual effect parameters with a transform and an input image. For the special case that the input image has uniform probability distribution, the uniform visual effect parameter for a transform is given by:

$$Vt=\iiint f(t(r,g,b))dr\, dg\, db$$

Figure 5:
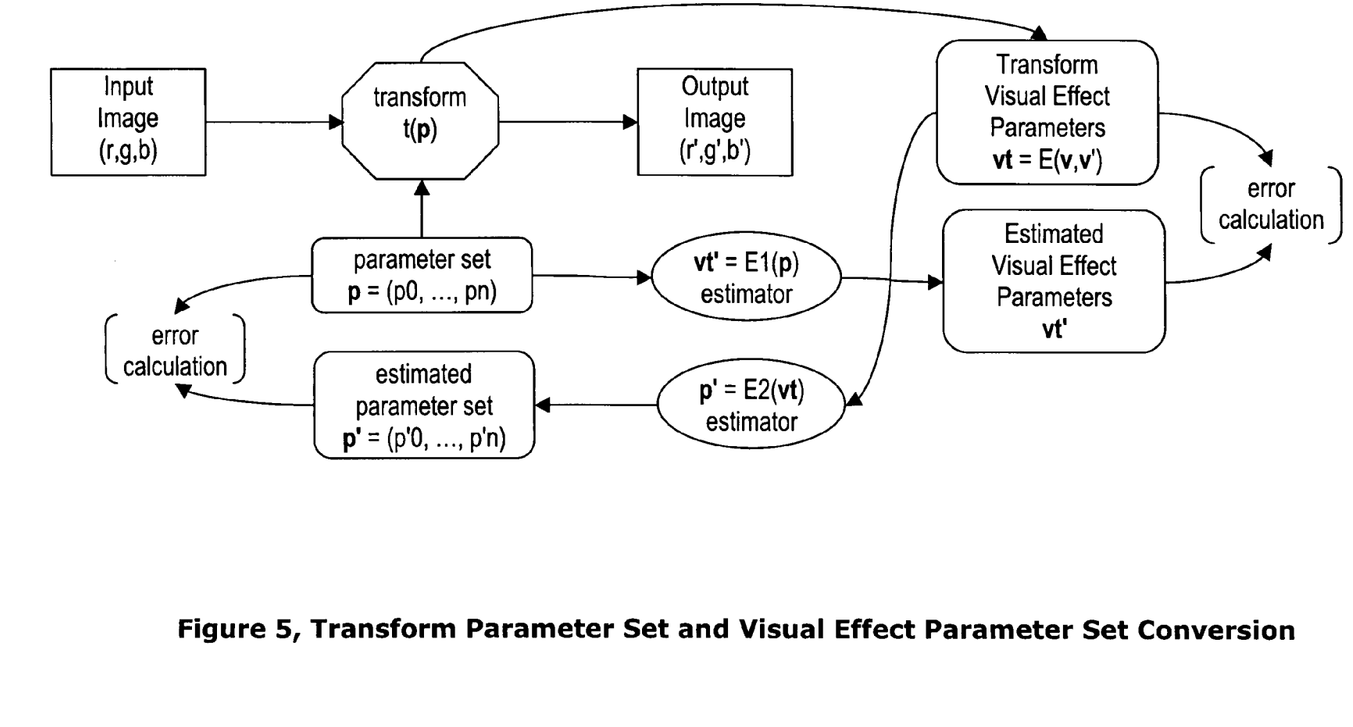
FIG. 5 shows transform parameter set and visual effect parameter set conversion.

FIG. 5 shows transform parameter set and visual effect parameter set conversion. This drawing shows the derivation of two estimator functions. The first estimates the visual parameters as a function of the synthesis parameters, and the second estimates the inverse function, the synthesis parameters as a function of the visual parameters. Associated with each estimate is an error measurement and the estimators are selected to minimize the error.

Figure 6:
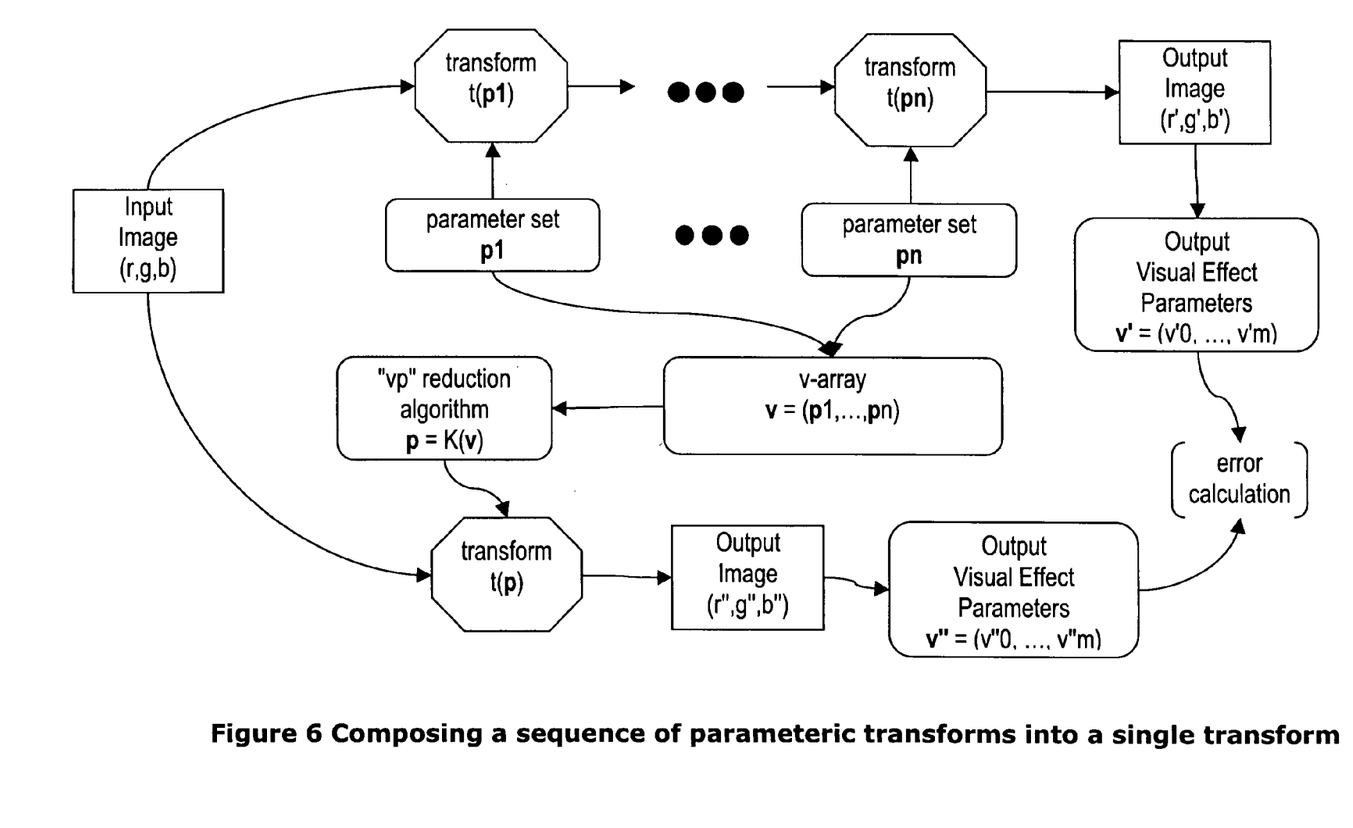
FIG. 6 shows composing a sequence of parametric transforms into a single transform.

FIG. 6 shows composing a sequence of parametric transforms into a single transform. This drawing shows the method of combining a sequence of parametric transforms into a single parametric transform. First, a v-array is constructed consisting of the set of p-arrays for each transform in the sequence. The reduction algorithm on page 13 of the Provisional Application, p=K(V) reduces the v-list to a p-list. This p-list is used to synthesize an equivalent transform.

Figure 7:
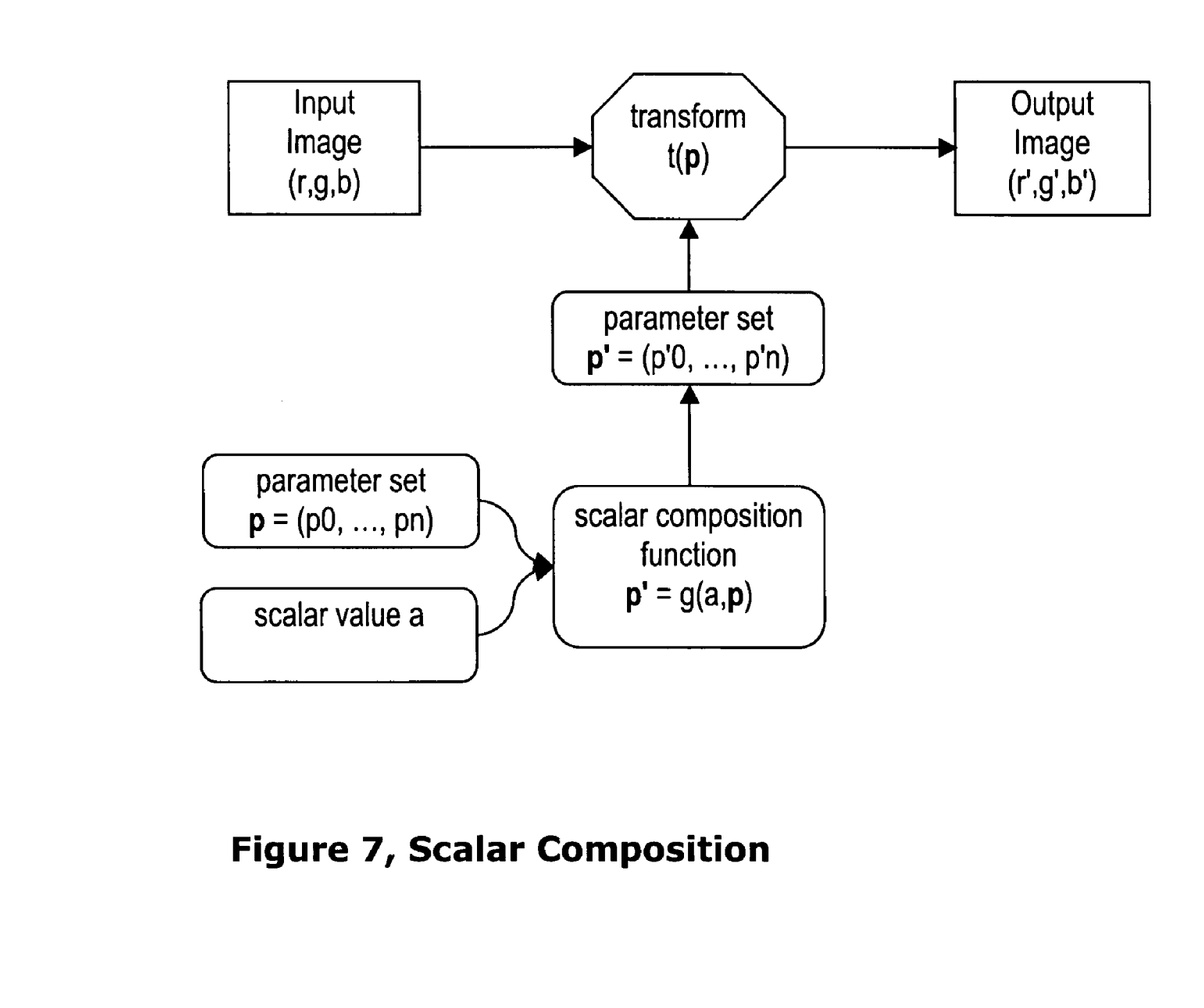
FIG. 7 shows scalar composition.

FIG. 7 shows scalar composition. Page 7 of the Provisional Application, section "Fundamental Definition and Algorithms," subsection "Analytic selective transforms" presents the notation and definition for a set of analytic selective functions. In most of the figures, the selective functions are equivalent to the visual effect functions.

Figure 8:
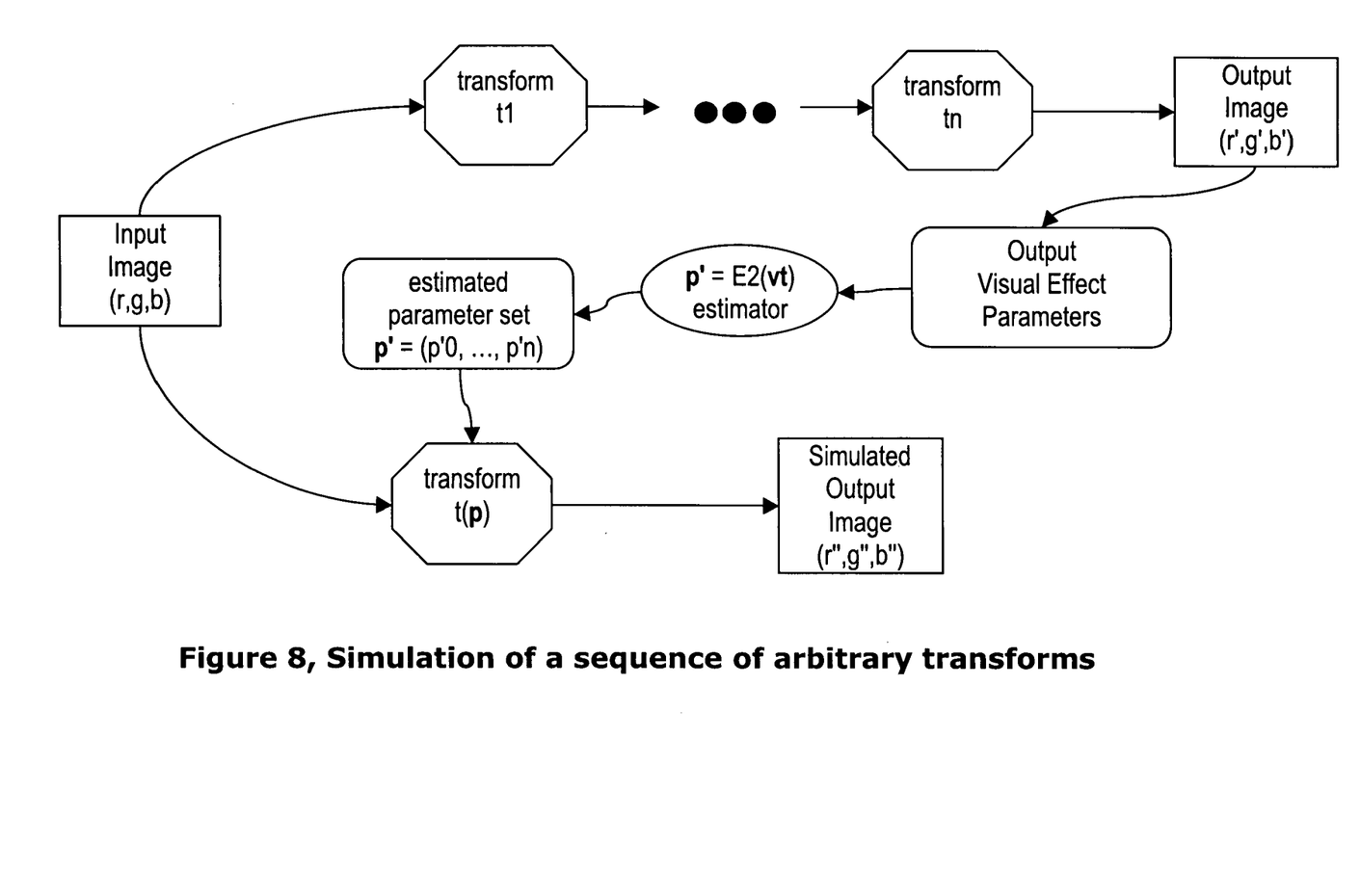
FIG. 8 shows simulation of a sequence of arbitrary transforms.

FIG. 8 shows simulation of a sequence of arbitrary transforms. This drawing shows a sequence of arbitrary transforms used to process an input image to an output image. It is desired to find a single transform that has the equivalent results as the sequence of transforms. This method calculates the visual effect parameters for the output image, estimates the corresponding p-array using the estimator in FIG. 5, and synthesizes a parametric transform.

Figure 9:
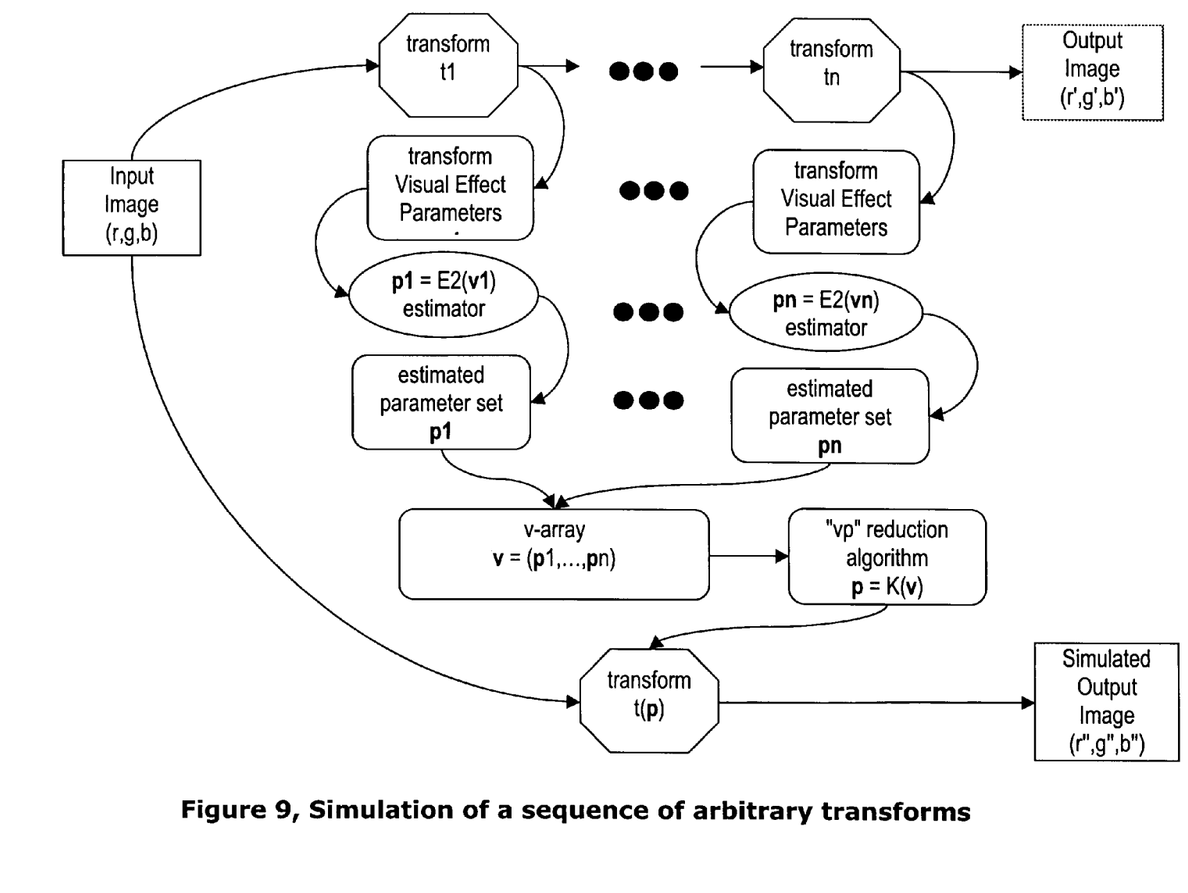
FIG. 9 shows the simulation of a sequence of arbitrary transforms.

FIG. 9 shows the simulation of a sequence of arbitrary transforms. The method shown in FIG. 8 requires that an output image is obtained and used to calculate the visual effect parameter array. FIG. 9 shows a method where the output image is not required. In this figure, the visual effect parameters for each transform are measured, then used to estimate a corresponding p-array. The resulting set of p-arrays forms a v-array which uses the reduction algorithm, p=K(v) (page 13 of the Provisional Application) to derive the corresponding p-array which is used to synthesize and equivalent transform.

Figure 10:
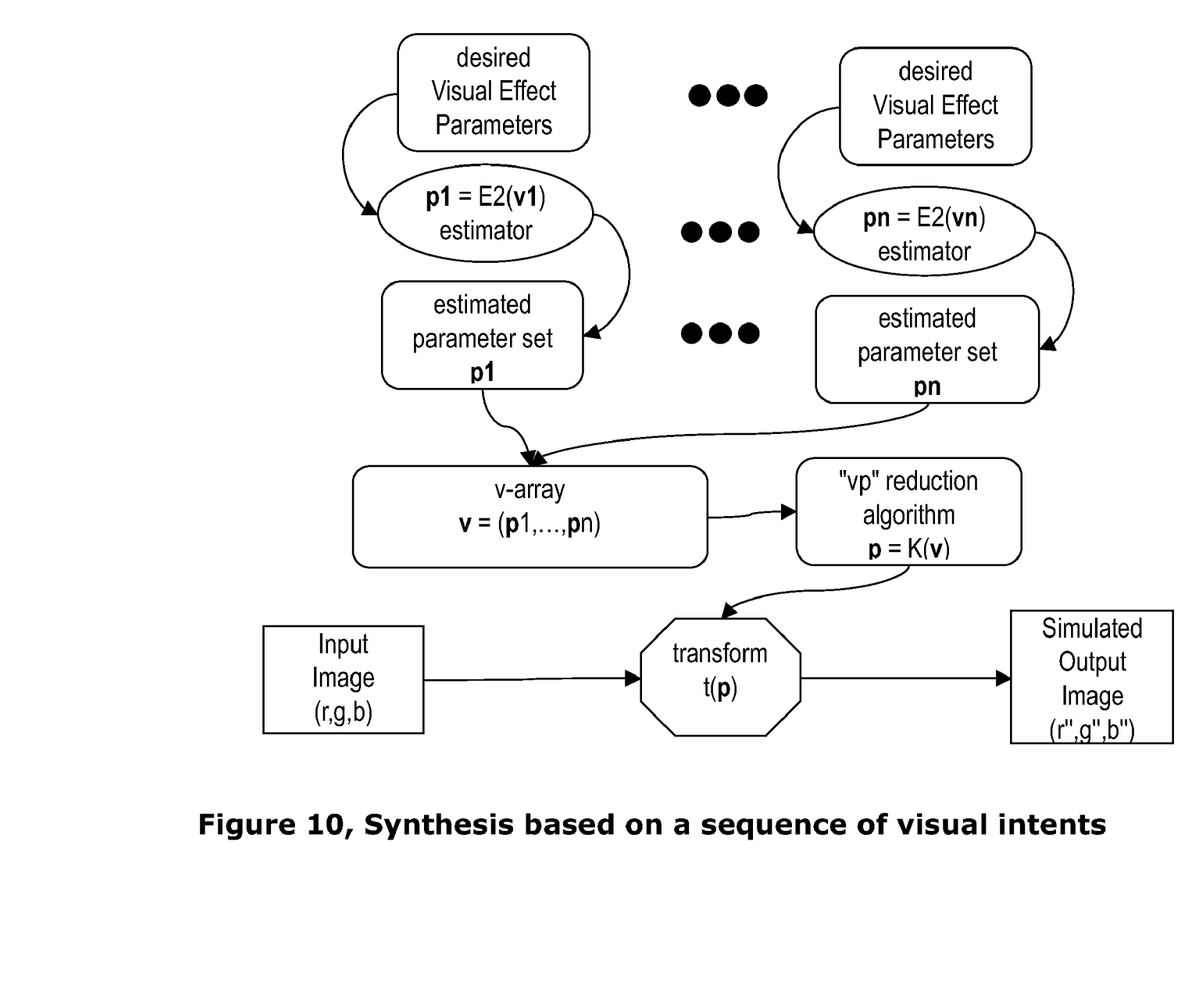
FIG. 10 shows the synthesis of a sequence of visual intents.

FIG. 10 shows the synthesis of a sequence of visual intents. The method shown in FIG. 9 requires that the output visual effect parameters from each of a sequence of transforms be calculated or measured. In this figure, the user simply specifies the desired visual effect parameters for each stage. From this a transform is synthesized as in FIG. 9.

The specification of the desired visual effect parameters is facilitated by using the "Unified User Interface" presented on page 14 of the Provisional Application. Note that that using a sequence of visual intents gives an intuitive and powerful method of specifying very complex transforms. This is a significant aspect to the authoring and editing capabilities set forth in the Provisional Application.

Figure 11:
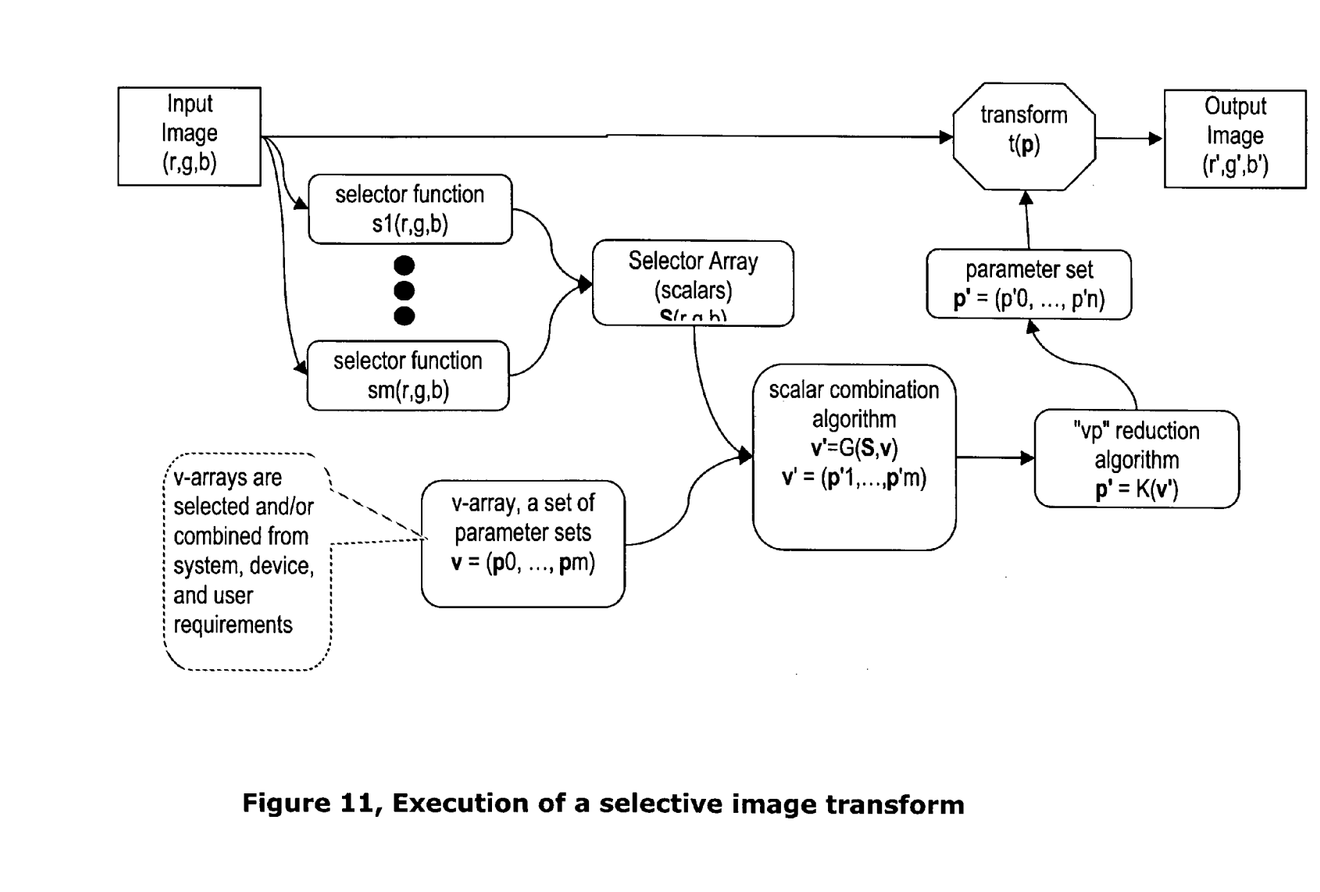
FIG. 11 shows the execution of a selective image transform.
Figure 12:
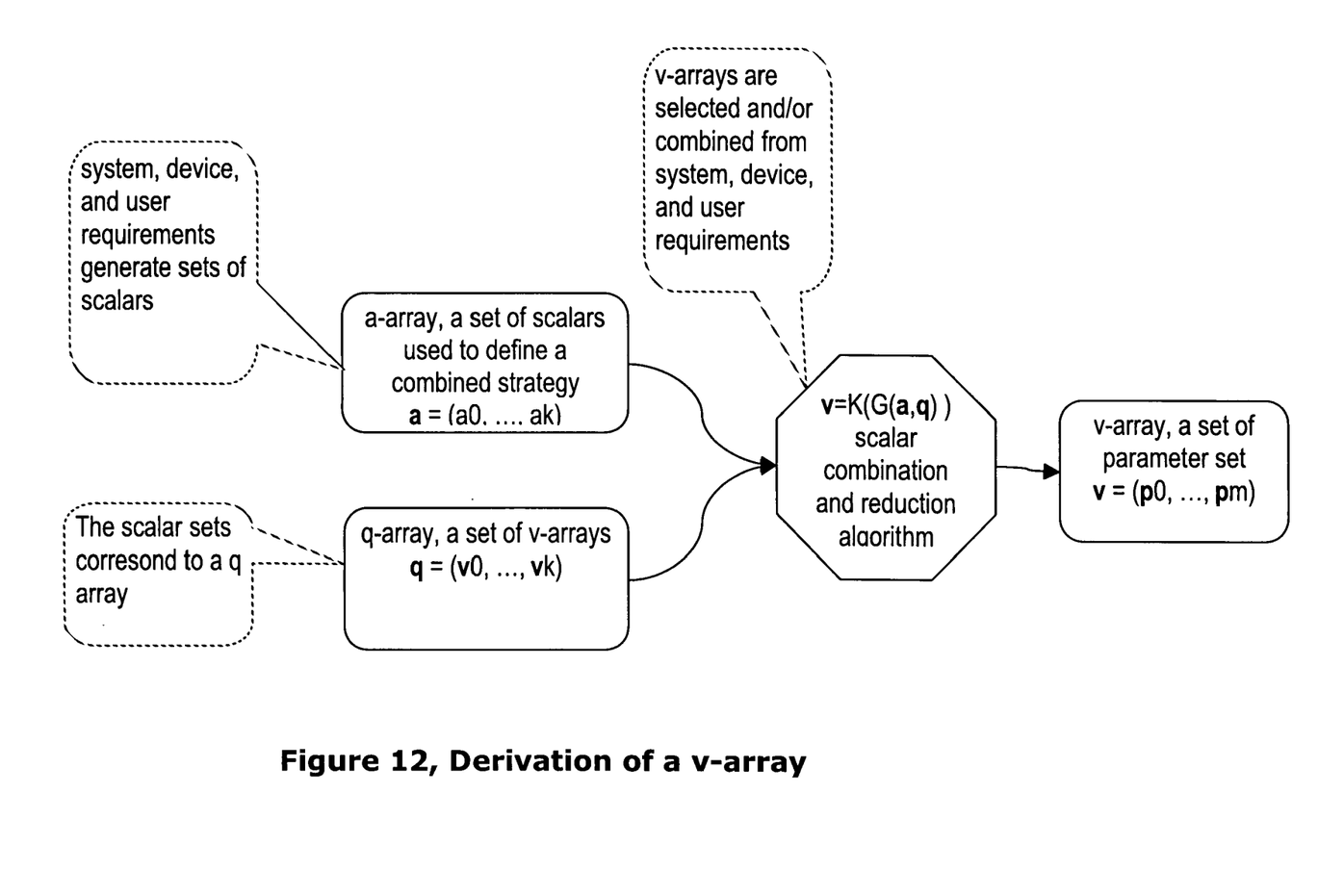
FIG. 12 shows the derivation of a v-array.
Figure 13:
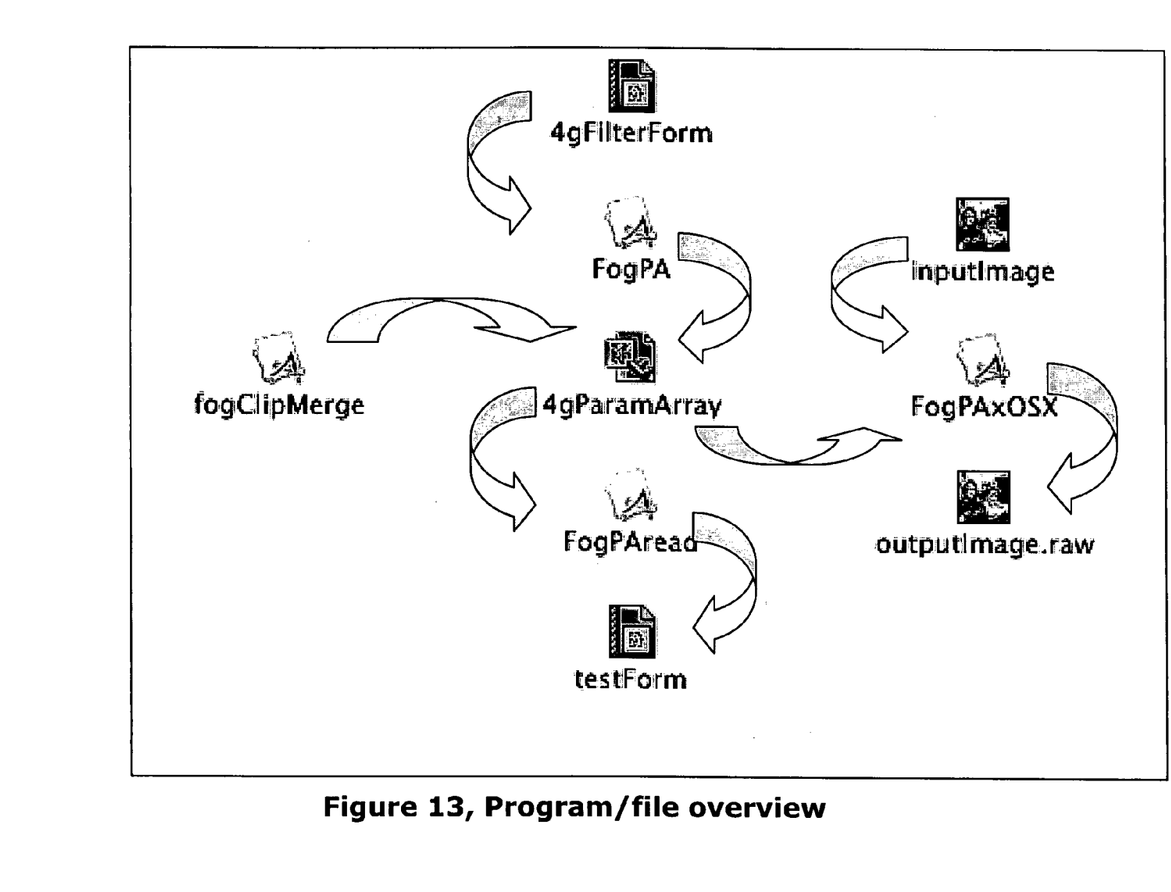
FIG. 13 shows a program/file overview.

FIG. 11 shows the execution of a selective image transform. Page 13 of the Provisional Application, section "Fundamental Algorithms for an Image Processing System," subsection "Execution" states the following equations for calculating a v-array.

$$x'=t(K(G(S(x),v)),x),\text{ where}$$

x=an input pixel value, typically x=(r,g,b)
x'=an output pixel value, x'=(r',g',b')
t is the parametric transform
v is a v-list consisting of n p-list structures
$S(x)=(s_1(x), \ldots, s_n(x))$ is a complete set of fundamental selectors
G is the scalar combination algorithm
K is the reduction algorithm that maps V into a p-list FIG. 12 shows the derivation of a v-array. Page 13 of the Provisional Application, section "Fundamental Algorithms for an Image Processing System," subsection "Combining processes at execution time" derives the equations for calculating a v-array.

The algorithm for combining the q-array to a single v-array for execution is $$V=K(G(A,Q),\text{ where}$$

G is the scalar combination algorithm
K is the reduction algorithm that maps Q into V The combined execution transform thus becomes:

$$x'=t(K(G(S(x),K(G(A,Q)))),x)$$

While the above is a complete description of specific embodiments of the invention, the above description should not be taken as limiting the scope of the invention as defined by the claims.

What is claimed is:

1. An image processing method comprising:
  generating a synthesized image transform from a set of synthesizing parameters; and
  subjecting the input image to the synthesized image transform to form an output image wherein:
  the synthesized image transform is generated from a set of synthesizing parameters;
  the synthesizing parameters have a defined domain of allowed values;

the complete set of synthesized transforms is obtained by varying the synthesizing parameters over all values within the domain;

the visual effect of each synthesized transform is characterized by a set of visual effect parameters; and the visual effect parameters and the synthesizing parameters are related in that
   the visual effect parameters are generated from the synthesizing parameters for the complete set of transforms, or
   the synthesizing parameters are generated from the visual effect parameters for the complete set of transforms.

2. The method of claim 1 wherein:
the synthesizing parameter sets are composable; that is, a function or algorithm combines two or more sets of synthesizing parameters into a single set of synthesizing parameters; and
the composed synthesizing parameters are sequentially equivalent; that is, an image processed sequentially by two or more synthetic transforms will be equivalent to an image processed through a single transform which has been synthesized from the synthesizing parameter set composed from the synthesizing parameter sets of the sequential transforms.

3. The method of claim 2 wherein the equivalency of the single image transform and the sequential image transform is measured by mean square error.

4. The method of claim 2 wherein the equivalency of the single image transform and the sequential image transform is measured by visual effect parameters.

5. The method of claim 2 wherein the synthesizing parameter set composition function and the synthesizing parameter set to visual effect parameter estimation function are used to calculate or estimate a visual effect parameter composition function.

6. The method of claim 5 wherein for each value of a, there is another scalar $a_{inv}$ such that the transform synthesized from the scalar composition of the parameter array and $a_{inv}$ is the inverse transform the transform synthesized form the scalar composition of the parameter array and the scalar a.

7. The method of claim 2 and claim 5 wherein:
an arbitrary scalar value is given for each of the parameter sets,
the scalar composition function combines the corresponding scalars and parameter sets, and
the composition function combines the parameter sets into a single parameter set.

8. The method of claim 2 or claim 5 wherein a minimum set of "critical" transforms is used and the composition function and scalar composition function are used to generate all other transforms in the complete set.

9. The method of claim 7 wherein data values on the gamut surface remain on the surface, but may be moved to different locations on the surface.

10. The method of claim 7 wherein data values not on the gamut surface are not moved onto the surface or across the surface.

11. The method of claim 9 wherein for each pixel, the two values used for the transform are the largest and smallest, and the value calculated is the intermediate.

12. The method of claim 2 wherein:
the desired output visual effect is characterized by two or more sets of visual effect parameters;
the synthesizing parameter sets are calculated or estimated from each of the sets of visual effect parameters; and a single synthesizing parameter set is calculated from the multiple parameter sets using the composition function or algorithm.

13. The method of claim 2 wherein:
the desired output visual effect is characterized by two or more sets of visual effect parameters;
a single equivalent set of visual parameters is calculated or estimated from the two or more sets of visual effect parameters; and
a single synthesizing parameter set is calculated or estimated from the single equivalent set of visual parameters.

14. The method of claim 2 wherein:
an input image is processed by a sequence of two or more arbitrary image transforms to produce an output image;
the visual effect of each transform is characterized by a set of visual parameters;
the synthesizing parameter sets are calculated or estimated from the sets of visual effect parameters; and
a single synthesizing parameter set is calculated from the multiple parameter sets using the composition function or algorithm.

15. The method of claim 1 wherein:
there is a given synthesized transform and parameter array;
an arbitrary scalar value, a, is selected;
a scalar composition function that combines the scalar value with the parameter array to create a new parameter array is calculated or estimated; and
a new transform is synthesized from the new parameter array.

16. The method of claim 15 wherein there is a scalar value $a_0$ wherein the new synthesized transform is the identity transform.

17. The method of claim 1 wherein:
the desired output visual effect is characterized by a set of visual effect parameters; and
the synthesizing parameter sets are calculated or estimated from the set of visual effect parameters.

18. The method of claim 1 wherein:
an input image is processed by a sequence of one or more arbitrary image transforms to produce an output image;
the visual effect of the output image is characterized by a set of visual parameters; and
the synthesizing parameter set is calculated or estimated from the set of visual effect parameters.

19. The method of claim 1 wherein some of the synthesized transforms in the complete set are selective transforms; that is, transforms that are applied only to a particular combination of objects, image locations and range of colors in the input image and leave the image unchanged elsewhere.

20. The method of claim 19 wherein the transition from the selected region to the non-selected region is a smooth transition.

21. The method of claim 1 wherein some of the transforms preserve data values on gamut, which is defined as a specified surface in color space.

22. The method of claim 21 wherein two values of (r,g,b) are transformed and the third value is calculated by the hue preserving constraint.

23. The method of claim 1 wherein some of the transforms preserve data values on a line, which is defined as a trajectory in color space.

24. The method of claim 23 wherein data values on the line remain on the line, but may be moved to different locations on the line.

25. The method of claim 23 wherein data values not on the line are not moved onto the line.

26. The method of claim 23 wherein the transform has continuous slope on the line.

27. The method of claim 1 wherein some of the transforms preserve hue.

28. The method of claim 1 wherein the synthesized transform is executed in either software, hardware, firmware, or some combination thereof.

29. The method of claim 1 wherein the synthesized transform is executed in either a source device, output device, mobile device, computer workstation, archival system or during transfer between devices.

30. The method of claim 1 wherein the synthesized transform is executed in a network topology in either a server device, client device, peer-to-peer device or during transfer between devices.

31. The method of claim 1 wherein one or more parameter sets are stored in one or more files.

32. The method of claim 1 wherein the parameter sets are stored in a data structure such as defined by a C code struct or by an XML tagged structure.

33. The method of claim 29 wherein the file contains meta information such as creation date, author related to each parameter set.

34. The method of claim 29 wherein a particular parameter set is selected and where the selection is made by one or more of:
 a graphics user interface;
 a hardware user interface such as a dial or button;
 a browser interface;
 a program;
 environmental;
 a device; and
 an expert system.

35. The method of claim 1 wherein a new parameter array is created or an existing parameter array is edited or modified by means of one or more of interactive controls, declarative statements, command language, an application, a browser application, or form based.

36. The method of claim 1 wherein the complete set of synthesized transforms include any or all of the following types of transforms:
 device color correction;
 visual enhancement;
 visual dynamic range enhancement;
 gray removal;
 spatial;
 compression improvement;
 compression artifact reduction; or
 adaptive spatial filter.

37. Image processing apparatus comprising:
 input and output devices;
 a processor;
 storage for instructions and data;
 the processor and storage being configured to:
 generate a synthesized image transform from a set of synthesizing parameters; and
 subject the input image to the synthesized image transform to form an output image wherein:
 the synthesized image transform is generated from a set of synthesizing parameters;
 the synthesizing parameters have a defined domain of allowed values;
 the complete set of synthesized transforms is obtained by varying the synthesizing parameters over all values within the domain;
 the visual effect of each synthesized transform is characterized by a set of visual effect parameters; and
 the visual effect parameters and the synthesizing parameters are related in that
  the visual effect parameters are generated from the synthesizing parameters for the complete set of transforms, or
  the synthesizing parameters are generated from the visual effect parameters for the complete set of transforms.

* * * * *